United States Patent
Yamaoka et al.

(10) Patent No.: US 10,479,395 B2
(45) Date of Patent: Nov. 19, 2019

(54) STEERING SYSTEM

(71) Applicant: JTEKT CORPORATION, Osaka-shi, Osaka (JP)

(72) Inventors: Michiaki Yamaoka, Ikoma-gun (JP); Masayoshi Sakuda, Kashihara (JP); Yoshihito Yoshihara, Kashihara (JP); Atsumune Nagatani, Kashihara (JP); Satoki Yoshimura, Shiki-gun (JP); Yu Myohoji, Habikino (JP)

(73) Assignee: JTEKT CORPORATION, Osaka-shi (JP)

(*) Notice: Subject to any disclaimer, the term of this patent is extended or adjusted under 35 U.S.C. 154(b) by 137 days.

(21) Appl. No.: 15/888,353

(22) Filed: Feb. 5, 2018

(65) Prior Publication Data

US 2018/0229757 A1 Aug. 16, 2018

(30) Foreign Application Priority Data

Feb. 13, 2017 (JP) .................................. 2017-024370

(51) Int. Cl.
*B62D 1/19* (2006.01)
*B62D 1/189* (2006.01)

(52) U.S. Cl.
CPC ............. *B62D 1/192* (2013.01); *B62D 1/189* (2013.01); *B62D 1/19* (2013.01)

(58) Field of Classification Search
CPC ........... B62D 1/192; B62D 1/189; B62D 1/19
See application file for complete search history.

(56) References Cited

U.S. PATENT DOCUMENTS

2006/0163861 A1 7/2006 Higashino
2013/0298718 A1* 11/2013 Ohara ................... B62D 1/187
74/493

(Continued)

FOREIGN PATENT DOCUMENTS

EP  1 516 798 A1  3/2005
EP  1 544 075 A1  6/2005

(Continued)

OTHER PUBLICATIONS

Jul. 18, 2018 European Search Report issued in European Patent Application No. 18156347.9.

*Primary Examiner* — Darlene P Condra
(74) *Attorney, Agent, or Firm* — Oliff PLC

(57) ABSTRACT

Provided is a steering system that is configured to absorb a secondary collision shock load and achieves high vibration rigidity with a simple structure. A lower jacket is externally fitted to an upper jacket in a slidable manner. A support member that supports the lower jacket includes a fixed portion that is fixed to a vehicle body. A shock of a secondary collision is absorbed by a shock absorbing mechanism. The shock absorbing mechanism includes second slide members configured to move together with the upper jacket, and to frictionally slide relative to the support member upon a secondary collision. The second slide member includes a sandwiched portion that is sandwiched between the support member and the lower jacket, and a transmitting portion that is brought into contact with both of the lower jacket and the support member at a position closer to the fixed portion than the sandwiched portion.

6 Claims, 7 Drawing Sheets

(56) References Cited

U.S. PATENT DOCUMENTS

| | | | |
|---|---|---|---|
| 2015/0239489 A1* | 8/2015 | Matsuno | B62D 1/187 74/493 |
| 2016/0052536 A1* | 2/2016 | Nicolussi | B62D 1/16 384/441 |
| 2016/0244087 A1* | 8/2016 | Sakuda | B62D 1/184 |
| 2018/0222519 A1* | 8/2018 | Johta | B62D 1/189 |

FOREIGN PATENT DOCUMENTS

| | | |
|---|---|---|
| EP | 1 627 796 A1 | 2/2006 |
| JP | 2004-017908 A | 1/2004 |

\* cited by examiner

STEERING SYSTEM

INCORPORATION BY REFERENCE

The disclosure of Japanese Patent Application No. 2017-024370 filed on Feb. 13, 2017 including the specification, drawings and abstract, is incorporated herein by reference in its entirety.

BACKGROUND OF THE INVENTION

1. Field of the Invention

The present invention relates to a steering system.

2. Description of the Related Art

There is known a steering system in which an upper jacket (inner column) is internally fitted to a lower jacket (outer column) in a telescopically adjustable manner. In this steering system, the lower jacket is supported by a support member fixed to a vehicle body, and the axial position of the upper jacket with respect to the lower jacket is adjusted by telescopic adjustment. Upon a secondary collision in the event of collision of vehicles, a shock load is generated, but is absorbed by a resistance force generated when the upper jacket frictionally slides relative to the lower jacket.

In a steering system of Japanese Patent Application Publication No. 2004-17908 (JP 2004-17908 A), a metallic ring is press-fitted to the outer peripheral surface of the upper jacket. Upon a secondary collision, the metallic ring strikes against the lower jacket after the upper jacket frictionally moves relative to the lower jacket. Then, the shock load is absorbed by a load corresponding to the sum of a resistance force generated when the upper jacket frictionally slides relative to the lower jacket and a resistance force generated when the upper jacket frictionally slides relative to the metallic ring.

In recent years, for the purpose of protecting a driver more appropriately upon a secondary collision, there has been a demand for a steering system capable of sufficiently absorbing the shock load immediately after the secondary collision occurs. In the steering system described in JP 2004-17908 A, upon the secondary collision, the metallic ring strikes against the lower jacket after the upper jacket frictionally moves relative to the lower jacket. In this case, immediately after the secondary collision occurs, the shock load is absorbed only by the resistance force generated when the upper jacket frictionally slides relative to the lower jacket. Therefore, it is likely that the shock load cannot sufficiently be absorbed from the time immediately after the secondary collision occurs.

In view of the above, there is proposed a steering system configured such that a slide member configured to move together with the upper jacket frictionally slides relative to the lower jacket and the support member upon a secondary collision. In this steering system, upon the secondary collision, the slide member frictionally slides relative to the lower jacket and the support member simultaneously with the start of a frictional slide of the upper jacket relative to the lower jacket. That is, two types of frictional slide are used in combination from the time immediately after the secondary collision occurs. Thus, the shock can sufficiently be absorbed immediately after the secondary collision occurs.

In the steering system, vibration generated in the vehicle body while the vehicle is traveling, for example, is transmitted to the upper jacket via the support member and the lower jacket in this order. If a low-rigidity portion is present in the vibration transmission path, the rigidity against vibration (vibration rigidity, which is the magnitude of an exciting force or the like per amplitude of vibration) decreases, and therefore the upper jacket is likely to vibrate. When the upper jacket vibrates, a steering member connected to the upper jacket vibrates as well. As a result, the operability of the vehicle decreases.

In the steering system constructed to have the slide member as described above, the slide member is interposed between the lower jacket and the support member. Therefore, vibration transmitted from the vehicle body to the support member is transmitted to the lower jacket via the slide member. In the steering system constructed to have the slide member, in order to sufficiently secure the resistance force to be generated by the friction between the slide member and each of the lower jacket and the support member, it is necessary that the slide member be interposed between the lower jacket and a part of the support member that is relatively easy to deflect (relatively low in rigidity). When the slide member is interposed between the lower jacket and the part of the support member that is relatively low in rigidity, vibration is transmitted to the lower jacket via the part of the support member that is relatively low in rigidity. In this case, the lower jacket and the upper jacket are likely to vibrate, and therefore the vibration rigidity may decrease.

SUMMARY OF TIE INVENTION

It is one object of the present invention to provide a steering system configured to absorb a shock load of a secondary collision by a frictional slide between a slide member configured to move together with an upper jacket and each of a lower jacket and a support member, in which the vibration rigidity can be improved with a simple structure.

A steering system according to one aspect of the present invention includes an upper jacket, a lower jacket, a support member, and a shock absorbing mechanism. A steering member is connected to the upper jacket at one end in a column axis direction. The lower jacket is externally fitted to the other end of the upper jacket in the column axis direction in a slidable manner. The support member includes a fixed portion that is fixed to a vehicle body, and is configured to support the lower jacket. The shock absorbing mechanism is configured to absorb a shock of a secondary collision. The shock absorbing mechanism includes a slide member configured to move together with the upper jacket, and to frictionally slide relative to the lower jacket and the support member upon the secondary collision. The slide member includes a sandwiched portion and a transmitting portion. The sandwiched portion is sandwiched between the support member and the lower jacket. The transmitting portion is formed integrally with the sandwiched portion, and is brought into contact with both of the lower jacket and the support member at a position closer to the fixed portion than the sandwiched portion.

According to the aspect described above, in the slide member of the shock absorbing mechanism, the transmitting portion is brought into contact with both of the lower jacket and the support member at a position closer to the fixed portion of the support member than the sandwiched portion. Therefore, vibration is transmitted between the lower jacket and the support member via a part of the support member that is relatively high in rigidity. Thus, the vibration rigidity can be improved. Further, the transmitting portion is formed integrally with the sandwiched portion, thereby eliminating the need to add a new component for improving the vibration rigidity. As a result, the vibration rigidity can be improved with a simple structure.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
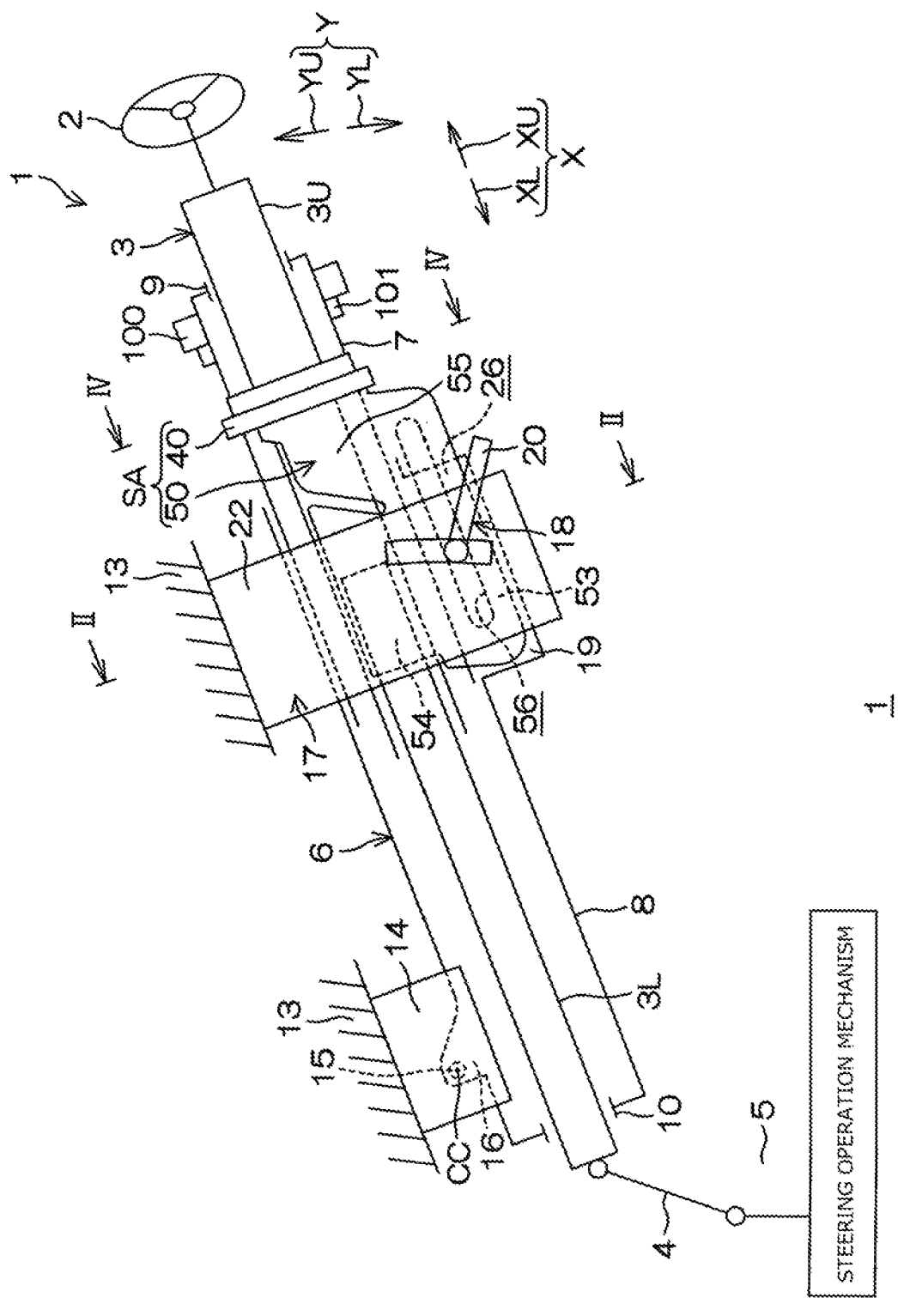
FIG. 1 is a schematic view illustrating an overall structure of a steering system according to a first embodiment of the present invention.

Embodiments of the present invention are described below in detail with reference to the accompanying drawings. FIG. 1 is a schematic view illustrating an overall structure of a steering system 1 according to a first embodiment of the present invention. Referring to FIG. 1, the steering system 1 includes a steering shaft 3, a column jacket 6, an intermediate shaft 4, and a steering operation mechanism 5. A steering member 2 such as a steering wheel is coupled to one end (upper axial end) of the steering shaft 3. The steering system 1 turns steered wheels (not illustrated) in conjunction with a steering operation of the steering member 2. For example, the steering operation mechanism 5 is a rack and pinion mechanism, but is not limited thereto.

An upper side in a column axis direction X that is the axial direction of the steering shaft 3 is hereinafter referred to as an axial direction upper side XU, and a lower side in the column axis direction X is hereinafter referred to as an axial direction lower side XL. The steering shaft 3 includes a tubular upper shaft 3U and a lower shaft 3L. The upper shaft 3U and the lower shaft 3L are fitted to each other in a relatively movable manner by, for example, spline fitting or serration fitting. The steering member 2 is coupled to one end of the upper shaft 3U on the axial direction upper side XU.

The column jacket 6 includes an upper jacket 7 and a lower jacket 8. The steering member 2 is connected to one end of the upper jacket 7 via the upper shaft 3U. The lower jacket 8 is externally fitted to the other end of the upper jacket 7 in a slidable manner. The upper jacket 7 is also an inner jacket, and the lower jacket 8 is also an outer jacket.

The column axis direction X is also an axial direction of the upper jacket 7 and an axial direction of the lower jacket 8. The axial direction upper side XU is also one end side of the upper jacket 7, and the axial direction lower side XL is also the other end side of the upper jacket 7.

The steering shaft 3 is inserted through the column jacket 6. The upper shaft 3U is rotatably supported by the upper jacket 7 via a bearing 9. The lower shaft 3L is rotatably supported by the lower jacket 8 via a bearing 10. When the upper shaft 3U moves in the column axis direction X relative to the lower shaft 3L, the upper jacket 7 moves in the column axis direction X relative to the lower jacket 8. The column jacket 6 is extensible and contractible in the column axis direction X together with the steering shaft 3.

By extending or contracting the steering shaft 3 and the column jacket 6 in the column axis direction X, the position of the steering member 2 can be adjusted in a fore-and-aft direction of a vehicle. Thus, the steering system 1 has a telescopic adjustment function. The telescopic adjustment is performed by causing the upper jacket 7 to slide within a predetermined telescopic adjustment range. The telescopic adjustment range includes an upper limit adjustment position of the upper jacket 7 in the column axis direction X, a lower limit adjustment position of the upper jacket 7 in the column axis direction X, and a position between the upper limit adjustment position and the lower limit adjustment position. When the upper jacket 7 is located at the upper limit adjustment position, the column jacket 6 extends most. When the upper jacket 7 is located at the lower limit adjustment position, the column jacket 6 contracts most.

Figure 2:
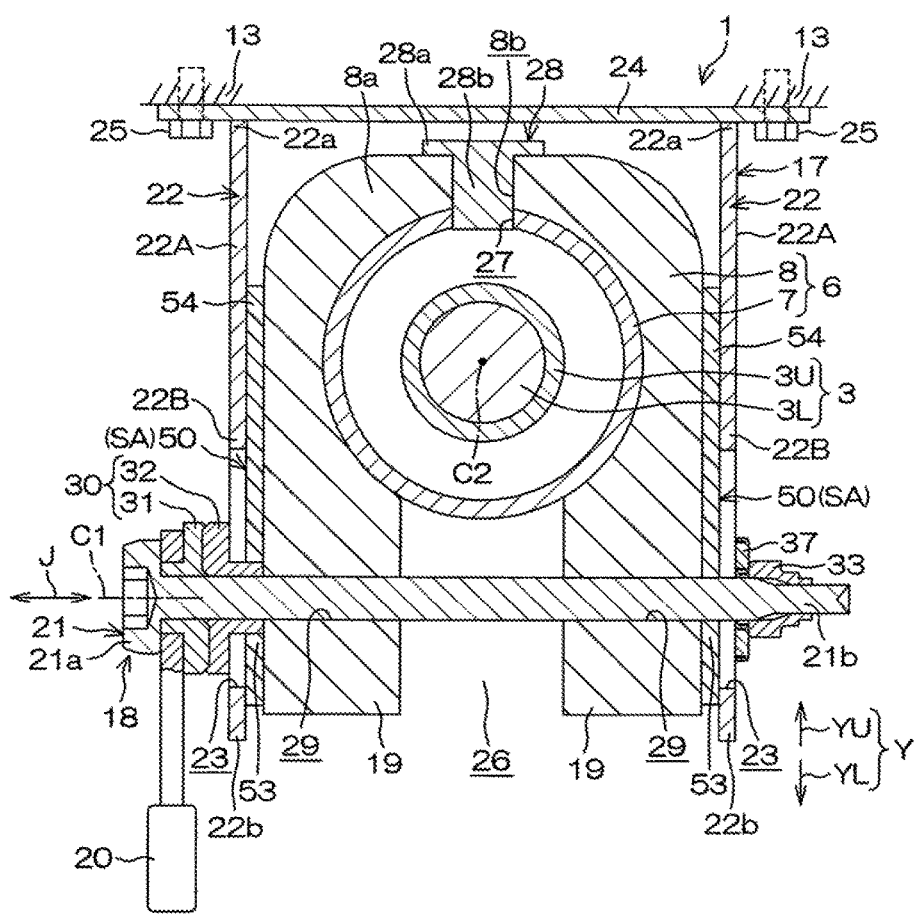
FIG. 2 is a schematic sectional view taken along a line II-II in FIG. 1.

FIG. 2 is a schematic sectional view taken along a line II-II in FIG. 1. A guiding groove 27 is formed in the upper jacket 7. The guiding groove 27 is long in the column axis direction X. A guided protrusion 28 is fixed to the lower jacket 8. The guided protrusion 28 is fitted to the guiding groove 27, and is movable in the column axis direction X relative to the guiding groove 27. An insertion hole 8b is formed in the lower jacket 8, and the guided protrusion 28 is inserted through the insertion hole 8b. The guided protrusion 28 includes a head portion 28a and a shaft portion 28b. The head portion 28a abuts against a part of the outer peripheral surface of the lower jacket 8 around the insertion hole 8b. The shaft portion 28b is inserted through the insertion hole 8b. The head portion 28a and the shaft portion 28b are formed integrally. The distal end of the shaft portion 28b is fitted to the guiding groove 27.

At the time of telescopic adjustment, the lower axial end of the guiding groove 27 abuts against the guided protrusion 28, so that the upper jacket 7 is regulated at the upper limit adjustment position in the telescopic adjustment range. Thus, the upper jacket 7 is prevented from being detached from the lower jacket 8. At the time of telescopic adjustment, the upper axial end of the guiding groove 27 abuts against the guided protrusion 28, so that the upper jacket 7 is regulated at the lower limit adjustment position in the telescopic adjustment range.

Referring to FIG. 1, the steering system 1 includes a fixed bracket 14, a tilt center shaft 15, and a column bracket 16. The fixed bracket 14 is fixed to a vehicle body 13. The tilt center shaft 15 is supported by the fixed bracket 14. The column bracket 16 is fixed to the outer periphery of the lower jacket 8, and is rotatably supported by the tilt center shaft 15. The steering shaft 3 and the column jacket 6 are pivotable in a tilt direction Y (substantially vertical direction) about a tilt center CC that is a central axis of the tilt center shaft 15. An upper side in the tilt direction Y is hereinafter referred to as a tilt direction upper side YU, and a lower side in the tilt direction Y is hereinafter referred to as a tilt direction lower side YL.

By pivoting the steering shaft 3 and the column jacket 6 about the tilt center CC, the position of the steering member 2 can be adjusted in the tilt direction Y. Thus, the steering system 1 has a tilt adjustment function. Referring to FIG. 2, the steering system 1 includes a support member 17 such as a bracket, and a tightening mechanism 18. The support member 17 is fixed to the vehicle body 13, and supports the lower jacket 8. The tightening mechanism 18 locks the position of the upper jacket 7 after the tilt adjustment and the telescopic adjustment. The tightening mechanism 18 tightens a pair of tightened portions 19 via the support member 17. The tightened portions 19 are integrally provided at an upper part of the lower jacket 8 in the column axis direction X.

The lower jacket 8 has a slit 26 extending from an upper axial end 8a of the lower jacket 8 to the axial direction lower side XL. The tightened portions 19 are arranged on both sides of the slit 26. The tightening mechanism 18 is attached to the tightened portions 19. When the tightening mechanism 18 tightens the tightened portions 19, the lower jacket 8 elastically reduces its diameter to tighten the upper jacket 7.

The support member 17 includes a plate-shaped fixed portion 24 and a pair of side plates 22. The fixed portion 24 is fixed to the vehicle body 13 via bolts 25 or the like. The side plates 22 extend from the fixed portion 24 to the tilt direction lower side YL. A tilt elongated hole 23 extending in the tilt direction Y is formed in each side plate 22. The tightened portions 19 of the lower jacket 8 are arranged between the side plates 22. A shaft insertion hole 29 that is a circular hole is formed in each tightened portion 19.

The tightening mechanism 18 includes a tightening shaft 21 (insertion shaft) and an operation lever 20. The operation lever 20 is used for rotationally operating the tightening shaft 21. A central axis C1 of the tightening shaft 21 corresponds to a rotation center of the operation lever 20. For example, the tightening shaft 21 is a bolt. The tightening shaft 21 is inserted through the tilt elongated holes 23 of both the side plates 22 of the support member 17 and through the shaft insertion holes 29 of both the tightened portions 19 of the lower jacket 8. At the time of tilt adjustment, the tightening shaft 21 and the lower jacket 8 move relative to the support member 17. At this time, the tightening shaft 21 moves in the tilt direction Y inside the tilt elongated holes 23.

A head portion 21a provided at one end of the tightening shaft 21 is fixed to the operation lever 20 so as to be rotatable together with the operation lever 20. The tightening mechanism 18 further includes a force conversion mechanism 30 that is interposed between the head portion 21a of the tightening shaft 21 and a first side plate 22 (left side plate 22 in FIG. 2) and is configured to convert an operation torque of the operation lever 20 to an axial force of the tightening shaft 21 (tightening force for tightening the side plates 22). The force conversion mechanism 30 includes a rotary cam 31 and a first tightening member 32. The rotary cam 31 is coupled to the operation lever 20 so as to be rotatable together with the operation lever 20, and movement of the rotary cam 31 in a tightening axis direction J relative to the tightening shaft 21 is restricted. The tightening axis direction J is a direction in which the central axis C1 extends. The first tightening member 32 engages with the rotary cam 31 to tighten the first side plate 22. The tightening member 32 is a non-rotary cam whose rotation is restricted. The first tightening member 32 faces a first tightened portion 19 of the lower jacket 8 (left tightened portion 19 in FIG. 2) in the tightening axis direction J.

The tightening mechanism 18 further includes a second tightening member 33 and a needle roller bearing 37. The second tightening member 33 tightens a second side plate 22 (right side plate 22 in FIG. 2). The needle roller bearing 37 is interposed between the second tightening member 33 and the second side plate 22. The second tightening member 33 is a nut engaging with a threaded portion 21b provided at the other end of the tightening shaft 21. The second tightening member 33 tightens the second side plate 22 via the needle roller bearing 37. The second tightening member 33 faces a second tightened portion 19 of the lower jacket 8 (right tightened portion 19 in FIG. 2) in the tightening axis direction J.

The rotary cam 31, the first tightening member 32, and the needle roller bearing 37 are supported by the outer periphery of the tightening shaft 21. The tightening member 32 is fitted to the tilt elongated hole 23 formed in the first side plate 22, thereby restricting rotation of the tightening member 32. When the rotary cam 31 rotates relative to the tightening member 32 along with rotation of the operation lever 20 in a locking direction, the tightening member 32 moves away from the rotary cam 31 along the tightening axis direction J. Thus, the side plates 22 of the support member 17 are clamped and tightened by the pair of tightening members 32 and 33.

At this time, each side plate 22 of the support member 17 tightens the corresponding tightened portion 19 of the lower jacket 8. As a result, movement of the lower jacket 8 in the tilt direction Y is restricted, thereby achieving a tilt lock. When both the tightened portions 19 are tightened, the lower jacket 8 elastically reduces its diameter to tighten the upper jacket 7. As a result, the upper jacket 7 is locked (kept) at a predetermined telescopic position within the telescopic adjustment range, thereby achieving a telescopic lock.

As described above, the tightening mechanism 18 tightens the lower jacket 8 onto the upper jacket 7 via the support member 17, thereby maintaining the position of the upper jacket 7 relative to the lower jacket 8. When the operation lever 20 rotates in an unlocking direction, the tightening member 32 moves closer to the rotary cam 31 along the tightening axis direction J along with the rotation of the rotary cam 31. Thus, the tightening of the side plates 22 by the pair of tightening members 32 and 33 is released, thereby enabling the tilt adjustment and the telescopic adjustment.

Figure 3:
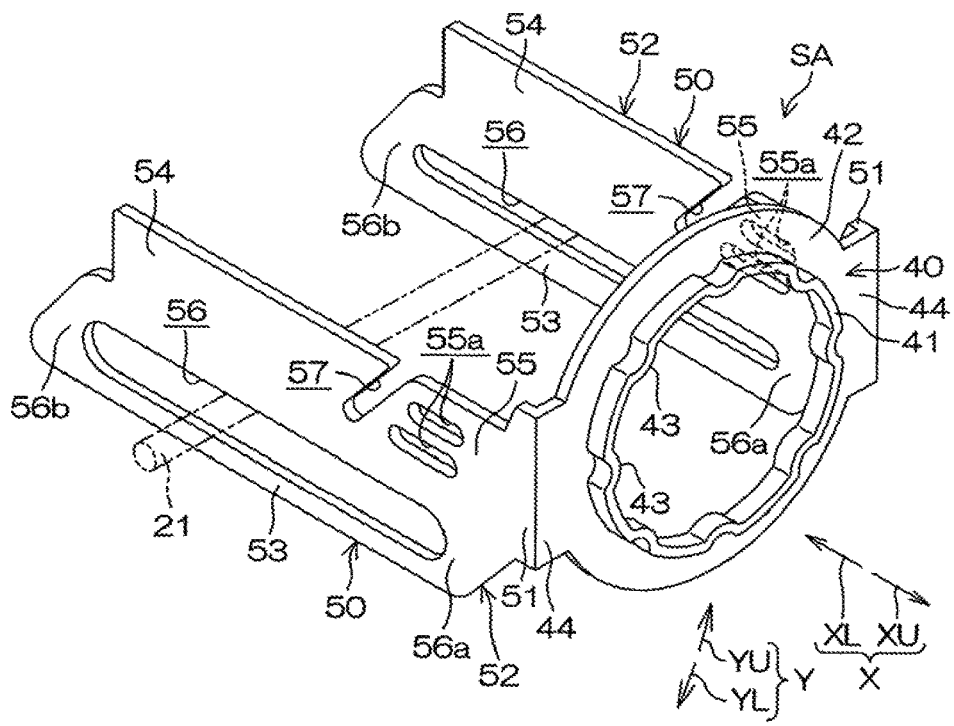
FIG. 3 is a perspective view of a shock absorbing mechanism provided in the steering system.
Figure 4:
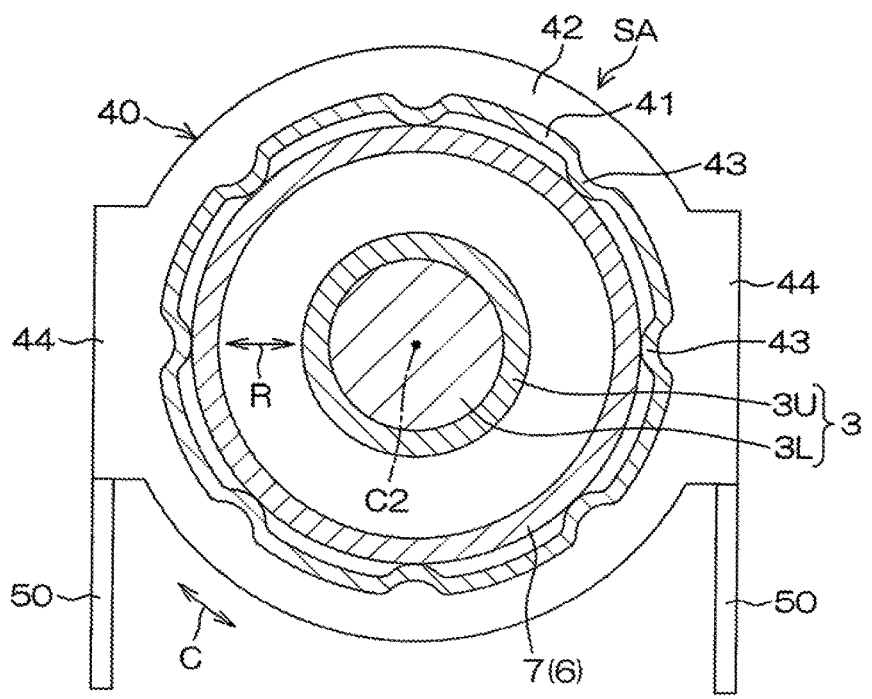
FIG. 4 is a schematic sectional view taken along a line IV-IV in FIG. 1.

Referring to FIG. 3, the steering system 1 further includes a shock absorbing mechanism SA configured to absorb a shock of a secondary collision. The shock absorbing mechanism SA includes a first slide member 40 (other slide member) and a pair of second slide members 50 (slide members). The first slide member 40 and the second slide members 50 are formed of a metal, and are formed integrally by press working or forging. FIG. 4 is a schematic sectional view taken along a line IV-IV in FIG. 1.

Referring to FIG. 4, the first slide member 40 is attached to the upper jacket 7 so as to be frictionally slidable relative to the upper jacket 7. For example, the first slide member 40 is press-fitted to the upper jacket 7. The frictional slide between the first slide member 40 and the upper jacket 7 is referred to as a first relative slide. A resistance force generated at the time of first relative slide is referred to as a first resistance force G1. The first slide member 40 includes a tubular fitting portion 41, a ring-shaped flange portion 42, and a plurality of (eight in this embodiment) protruding portions 43. The fitting portion 41 is externally fitted to the outer peripheral surface of the upper jacket 7. The flange portion 42 projects from one end of the fitting portion 41 in a radial direction R of the upper jacket 7. The protruding portions 43 protrude from the inner peripheral surface of the fitting portion 41 toward the outer peripheral surface of the upper jacket 7, and are brought into contact with the outer peripheral surface of the upper jacket 7. The radial direction R is a direction of a radius about a central axis C2 of the upper jacket 7.

The first resistance force G1 to be generated by the first relative slide can be adjusted by adjusting a frictional force between the protruding portions 43 and the outer peripheral surface of the upper jacket 7 or the strength of the protruding portions 43. The protruding portions 43 are arranged at regular intervals along a circumferential direction C of the outer peripheral surface of the upper jacket 7, and therefore the first resistance force G1 is stabilized easily.

The first slide member 40 further includes a pair of fixing portions 44 for fixing the second slide members 50. Each of the fixing portions 44 extends radially outward from the outer end of the flange portion 42 in the radial direction R. The term "radially outward" refers to a direction away from the central axis C2 in the radial direction R. The fixing portions 44 are arranged at positions spaced away from each other by 180° in the circumferential direction C so as to interpose the upper jacket 7 therebetween.

Referring to FIG. 1, an attachment 100 such as a combination switch or a key lock is attached to the upper jacket 7. The attachment 100 is attached on the axial direction upper side XU with respect to a part of the upper jacket 7 where the first slide member 40 is attached. The steering system 1 further includes a facing member 101 that is fixed to the upper jacket 7 and faces the first slide member 40 from the steering member 2 side in the column axis direction X (axial direction upper side XU). The lower axial end of the facing member 101 is located between the attachment 100 and the first slide member 40 on the upper jacket 7. For example, the facing member 101 is a bracket for attaching the attachment 100 to the upper jacket 7. The bracket is fixed to the upper jacket 7 by welding, caulking, press fitting, or the like. The facing member 101 is not limited to the bracket for attaching the attachment 100 to the upper jacket 7, and may be a bracket for attaching a vehicle component other than the attachment 100 (for example, a column cover, a wiring harness, or a knee airbag) to the upper jacket 7.

Referring to FIG. 3, the second slide member 50 is a substantially rectangular plate member extending from the first slide member 40 to the axial direction lower side XL. The second slide members 50 are formed integrally with the first slide member 40, and are therefore fixed (coupled) to the first slide member 40. Thus, the second slide members 50 and the first slide member 40 move together with the upper jacket 7 at the time of telescopic adjustment.

Referring to FIG. 2, the second slide members 50 are spaced away from each other in the tightening axis direction J so as to interpose the upper jacket 7 therebetween, and face each other in the tightening axis direction J. One second slide member 50 is interposed between the first side plate 22 and the first tightened portion 19. The other second slide member 50 is interposed between the second side plate 22 and the second tightened portion 19. In a tightened state achieved by the tightening mechanism 18 (state in which the lower jacket 8 tightens the upper jacket 7), each second slide member 50 is pressed against the corresponding tightened portion 19 by the corresponding tightening member 32 or 33.

A frictional slide between the second slide members 50 and the side plates 22 and between the second slide members 50 and the tightened portions 19 in the tightened state achieved by the tightening mechanism 18 is referred to as a second relative slide. A resistance force generated by the second relative slide is referred to as a second resistance force G2. The second resistance force G2 can be adjusted by adjusting frictional forces between the second slide members 50 and the side plates 22 and between the second slide members 50 and the lower jacket 8. Each of the side plates 22 is deflectable so as to move its distal end 22*b* about a coupling portion 22*a* between the fixed portion 24 and the side plate 22 in a direction in which the side plates 22 face each other (corresponding to the tightening axis direction J). In the side plate 22, the rigidity decreases with increasing distance from the coupling portion 22*a*. Therefore, a part of the side plate 22 on the tilt direction lower side YL with respect to the central axis C2 of the upper jacket 7 is lower in rigidity than a part of the side plate 22 on the tilt direction upper side YU with respect to the central axis C2 of the upper jacket 7. The part of the side plate 22 on the tilt direction upper side YU with respect to the central axis C2 of the upper jacket 7 is referred to as a high-rigidity portion 22A, and the part of the side plate 22 on the tilt direction lower side YL with respect to the central axis C2 of the upper jacket 7 is referred to as a low-rigidity portion 22B. The rigidity of the low-rigidity portion 22B further decreases because the tilt elongated hole 23 is formed in the low-rigidity portion 22B.

Referring to FIG. 3, the second slide member 50 includes a fixing portion 51 and an extending portion 52. The fixing portion 51 is fixed to the first slide member 40. The extending portion 52 extends parallel to the column axis direction X. Referring also to FIG. 2, the extending portion 52 of each second slide member 50 includes a sandwiched portion 53 and a transmitting portion 54. The sandwiched portion 53 is sandwiched between the lower jacket 8 and the corresponding side plate 22 at the time of tightening performed by the tightening mechanism 18. The transmitting portion 54 transmits vibration between the support member 17 and the lower jacket 8. The extending portion 52 of each second slide member 50 further includes a coupling portion 55 that couples the sandwiched portion 53 and the fixing portion 51 to each other (see FIG. 3).

An axially elongated hole 56 is formed in the sandwiched portion 53. The axially elongated hole 56 is long in the column axis direction X, and the tightening shaft 21 is inserted through the axially elongated hole 56. The first tightening member 32 supported by the tightening shaft 21 is inserted through the axially elongated hole 56 of the one second slide member 50 (see FIG. 2). The sandwiched portion 53 is located on a side (tilt direction lower side YL) opposite to the fixed portion 24 side with respect to the central axis C2 of the upper jacket 7. The transmitting portion 54 of each extending portion 52 has a shape of a flat plate extending from the sandwiched portion 53 toward the fixed portion 24 side (tilt direction upper side YU) between the lower jacket 8 and the corresponding side plate 22 of the support member 17.

In each second slide member 50, the sandwiched portion 53 is particularly firmly sandwiched between the low-rigidity portion 22B of the corresponding side plate 22 and the tightened portion 19. Therefore, at the time of second relative slide, the sandwiched portion 53 of each extending portion 52 frictionally slides mainly relative to the low-rigidity portion 22B of the corresponding side plate 22 and the tightened portion 19. The transmitting portion 54 of each extending portion 52 is also a contact portion to be brought into contact with both of the corresponding side plate 22 of the support member 17 and the lower jacket 8 at least in the tightened state of the tightening mechanism 18 at a position closer to the fixed portion 24 (tilt direction upper side YU) than the sandwiched portion 53. Specifically, at least a part of the transmitting portion 54 of each extending portion 52 is brought into contact with both of the corresponding side plate 22 of the support member 17 and the lower jacket 8 at a position closer to the fixed portion 24 (tilt direction upper side YU) than the central axis C2 of the upper jacket 7. In other words, at least a part of each transmitting portion 54 is brought into contact with the high-rigidity portion 22A of the corresponding side plate 22. Vibration is transmitted at a position closer to the fixed portion 24 than the sandwiched portion 53 (position on the tilt direction upper side YU with respect to the sandwiched portion 53).

The coupling portion 55 is coupled to an end on the fixed portion 24 side (tilt direction upper side YU) at a part of the sandwiched portion 53 on the axial direction upper side XU with respect to a central part of the sandwiched portion 53 in the column axis direction X. The coupling portion 55 is arranged between the transmitting portion 54 and the fixing portion 51 in the column axis direction X. A slit 57 is formed between the coupling portion 55 and the transmitting portion 54 in the column axis direction X so as to separate the coupling portion 55 and the transmitting portion 54 from each other in the column axis direction X. The slit 57 extends obliquely to the column axis direction X so that the width of the transmitting portion 54 in the tilt direction Y increases toward the axial direction lower side XL. Through holes 55a are formed in the coupling portion 55 so as to reduce the bending rigidity of the extending portion 52.

Figure 5A:
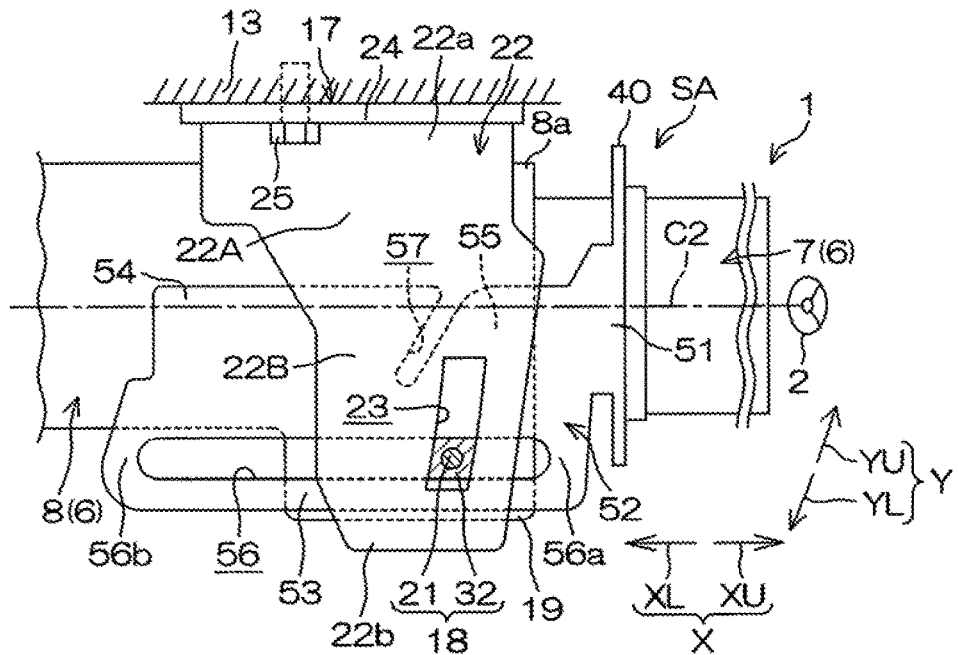
FIGS. 5A and 5B are schematic side views of the periphery of the shock absorbing mechanism.
Figure 5B:
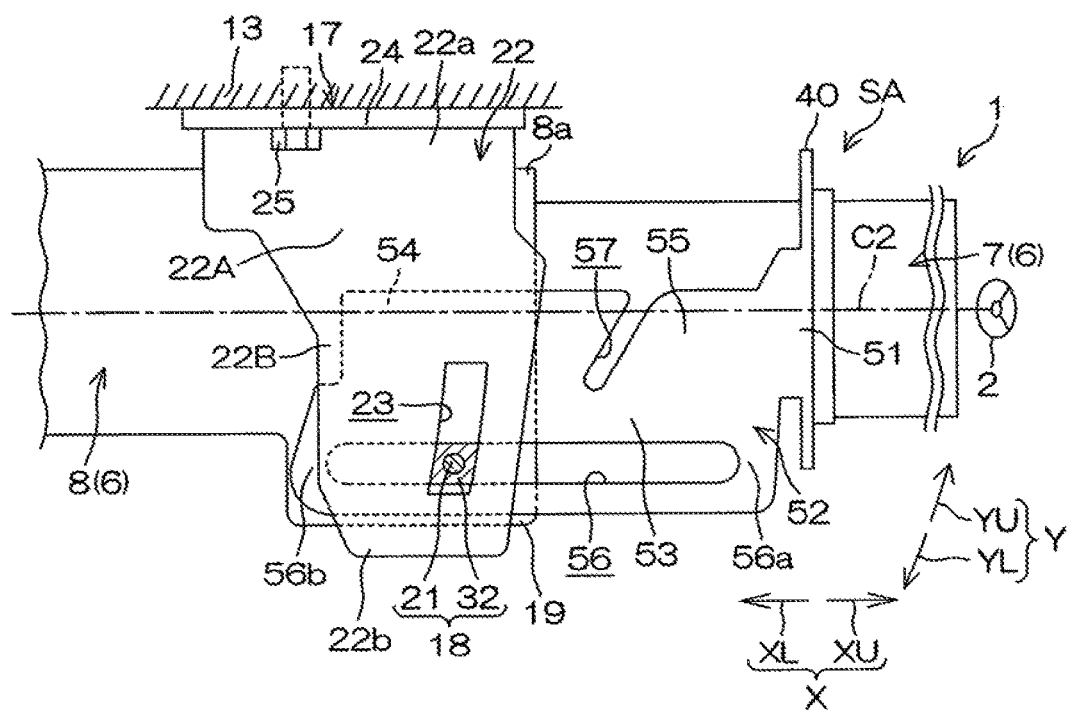

FIG. 5A and FIG. 5B are schematic side views of the periphery of the shock absorbing mechanism SA. FIG. 5A illustrates a state in which the upper jacket 7 is located at the lower limit adjustment position, and FIG. 5B illustrates a state in which the upper jacket 7 is located at the upper limit adjustment position. Referring to FIG. 5A and FIG. 5B, the second slide members 50 move in the column axis direction X together with the upper jacket 7 at the time of telescopic adjustment. The tightening shaft 21 moves relative to the second slide members 50 along the column axis direction X inside the axially elongated holes 56. A part of the extending portion 52 that defines the axially elongated hole 56 from the axial direction upper side XU is referred to as an upper side defining portion 56a, and a part of the extending portion 52 that defines the axially elongated hole 56 from the axial direction lower side XL is referred to as a lower side defining portion 56b.

In a state in which the upper jacket 7 is located at an arbitrary position within the telescopic adjustment range, a clearance is provided between each of the tightening shaft 21 and the first tightening member 32 and each of the upper side defining portion 56a and the lower side defining portion 56b of the axially elongated hole 56. Specifically, even in the state in which the upper jacket 7 is located at the lower limit adjustment position at the time of telescopic adjustment as illustrated in FIG. 5A, the tightening shaft 21 and the first tightening member 32 are out of contact with the upper side defining portion 56a of the axially elongated hole 56 on the one second slide member 50. Even in the state in which the upper jacket 7 is located at the upper limit adjustment position at the time of telescopic adjustment as illustrated in FIG. 5B, the tightening shaft 21 and the first tightening member 32 are out of contact with the lower side defining portion 56b of the axially elongated hole 56 on the one second slide member 50. Although illustration is omitted, in the state in which the upper jacket 7 is located at an arbitrary position within the telescopic adjustment range, a clearance is provided between the tightening shaft 21 and each of the upper side defining portion 56a and the lower side defining portion 56b of the axially elongated hole 56 also on the other second slide member 50.

In the state in which the upper jacket 7 is located at the lower limit adjustment position as illustrated in FIG. 5A, a part of the transmitting portion 54 of the extending portion 52 of the one second slide member 50 is interposed between the lower jacket 8 and the corresponding side plate 22, and is in contact with both of the lower jacket 8 and the corresponding side plate 22. In the state in which the upper jacket 7 is located at the upper limit adjustment position as illustrated in FIG. 5B, a part of the transmitting portion 54 of the extending portion 52 of the one second slide member 50 is interposed between the lower jacket 8 and the corresponding side plate 22, and is in contact with both of the lower jacket 8 and the corresponding side plate 22. The transmitting portion 54 of the extending portion 52 of the other second slide member 50 has a structure similar to that of the transmitting portion 54 of the extending portion 52 of the one second slide member 50.

Figure 6A:
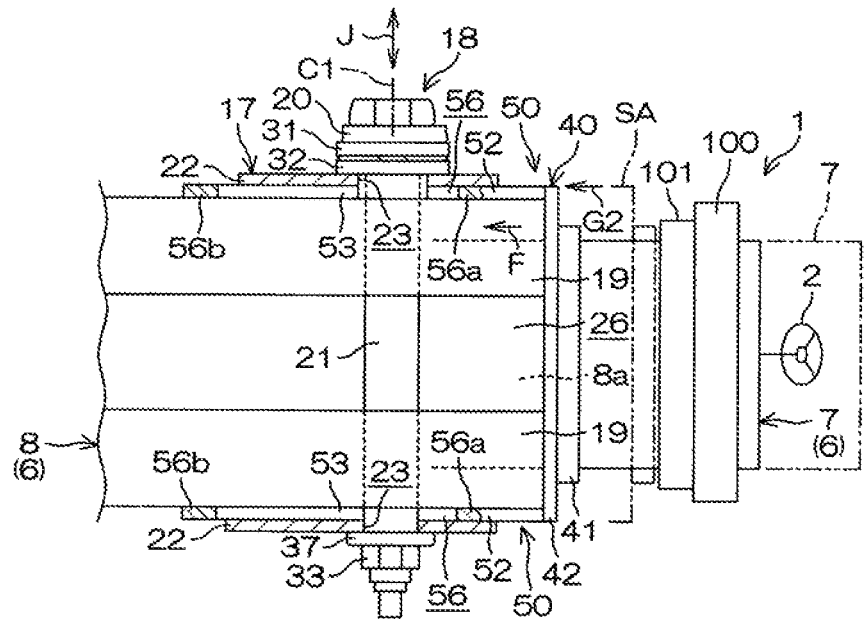
FIGS. 6A and 6B are schematic views illustrating states of the periphery of the shock absorbing mechanism when a secondary collision occurs.
Figure 6B:
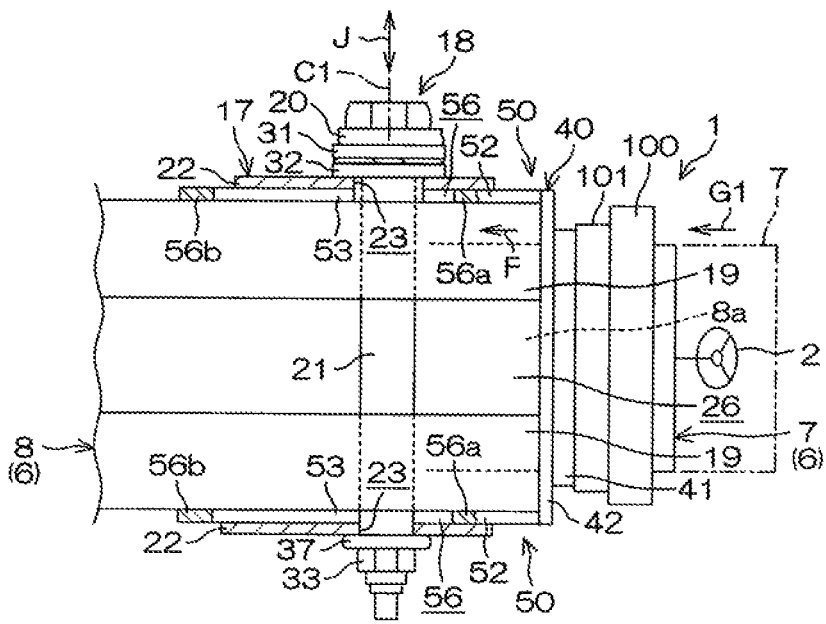

As described above, irrespective of the position of the upper jacket 7 within the telescopic adjustment range, each transmitting portion 54 is brought into contact with both of the lower jacket 8 and the corresponding side plate 22. Next, description is given of an operation of the steering system 1 when a secondary collision occurs in the event of collision of vehicles. The secondary collision refers to a collision of a driver of a vehicle with the steering member 2 in the event of collision of vehicles. FIGS. 6A and 6B are schematic views illustrating states of the periphery of the shock absorbing mechanism SA when a secondary collision occurs. FIG. 6B illustrates a state after the state illustrated in FIG. 6A.

When a secondary collision occurs in the tightened state achieved by the tightening mechanism 18, a shock is transmitted to the upper jacket 7 via the steering member 2. The lower jacket 8 is supported by the side plates 22 of the support member 17 fixed to the vehicle body 13. Therefore, upon the secondary collision, the upper jacket 7 moves to the axial direction lower side XL relative to the support member 17 and the lower jacket 8. Thus, the column jacket 6 contracts while causing the upper jacket 7 to frictionally slide relative to the lower jacket 8. A resistance force generated when the upper jacket 7 frictionally slides relative to the lower jacket 8 in a state in which the tightening is achieved by the tightening mechanism 18 is referred to as a column resistance force F.

For example, it is assumed that the first resistance force G1 generated by the first relative slide is larger than the second resistance force G2 generated by the second relative slide. In this case, the second relative slide is started first. Each second slide member 50 functions as a second resistance force generator configured to generate the second resistance force G2 by the second relative slide relative to the corresponding side plate 22 of the support member 17 and the lower jacket 8 upon a secondary collision. In the second relative slide, the tightening shaft 21 relatively moves to the first slide member 40 side (axial direction upper side XU) inside the axially elongated hole 56 with an elapse of time after the secondary collision is started.

In an initial stage of the secondary collision, the shock load corresponds to the sum of the second resistance force G2 generated by the second relative slide and the column resistance force F generated when the upper jacket 7 frictionally slides relative to the lower jacket 8. During the second relative slide, the upper axial end of the guiding groove 27 and the guided protrusion 28 abut against each other, and the guided protrusion 28 is broken. Also after the guided protrusion 28 is broken, the second relative slide continues. Therefore, the second relative slide is started immediately after the secondary collision occurs, irrespective of the position of the upper jacket 7 after undergoing the telescopic adjustment. Thus, the shock load can sufficiently be absorbed by the second resistance force G2 and the column resistance force F immediately after the secondary collision occurs.

Then, as illustrated in FIG. 6A, the first slide member 40 and the upper axial end 8a of the lower jacket 8 abut against each other. This abutment restricts the movement of the first slide member 40 and the second slide members 50 to the axial direction lower side XL relative to the lower jacket 8 and the support member 17. Thus, the movement of the second slide members 50 relative to the support member 17 and the lower jacket 8 is terminated. That is, the second relative slide is stopped. The upper axial end 8a of the lower jacket 8 functions as a second stopper configured to stop the second relative slide. The upper jacket 7 continues to move to the axial direction lower side XL relative to the lower jacket 8. Therefore, a relative movement between the upper jacket 7 and the first slide member 40 (first relative slide) is started. The first slide member 40 functions as a first resistance force generator configured to generate the first resistance force by the first relative slide relative to the upper jacket 7 upon a secondary collision.

After the first relative slide is started, the shock load corresponds to the sum of the first resistance force G1 generated by the first relative slide and the column resistance force F generated when the upper jacket 7 frictionally slides relative to the lower jacket 8. The first relative slide is stopped when the facing member 101 abuts against the first slide member 40 from the axial direction upper side XU (see FIG. 6B). As described above, the second relative slide occurs in the initial stage of the secondary collision, and the first relative slide occurs in the final stage of the secondary collision.

When the first resistance force G1 generated by the first relative slide is smaller than the second resistance force G2 generated by the second relative slide (G1<G2) unlike the case described above, the first relative slide occurs first. The first relative slide is stopped when the facing member 101 abuts against the first slide member 40 from the axial direction upper side XU. The facing member 101 functions as a first stopper configured to stop the first relative slide. When the first relative slide is terminated, the second relative slide is started. Also in this case, the shock load can sufficiently be absorbed by the first resistance force G1 and the column resistance force F immediately after the secondary collision occurs.

When the first resistance force G1 generated by the first relative slide and the second resistance force G2 generated by the second relative slide are equal to each other (G1=G2) unlike the cases described above, the first relative slide and the second relative slide may be started simultaneously or may occur alternately.

According to the first embodiment, in the second slide member 50 of the shock absorbing mechanism SA, the transmitting portion 54 is brought into contact with both of the lower jacket and the support member at a position closer to the fixed portion 24 of the support member 17 than the sandwiched portion 53. Therefore, vibration is transmitted between the lower jacket 8 and the support member 17 via a part of the support member 17 that is relatively high in rigidity.

The vibration rigidity decreases when the vibration transmission path is long, but in the first embodiment, the transmitting portion 54 is located at a position closer to the fixed portion 24 of the support member 17 than the sandwiched portion 53. Therefore, the vibration transmission path can be shortened as compared to a steering system having a structure in which the transmitting portion 54 is not provided in the second slide member 50. Thus, the vibration rigidity can be improved. Further, the transmitting portion 54 is formed integrally with the sandwiched portion 53, thereby eliminating the need to add a new component for improving the vibration rigidity.

As a result, the vibration rigidity can be improved with a simple structure. According to the first embodiment, the transmitting portion 54 of each extending portion 52 extends from the sandwiched portion 53 toward the fixed portion 24 between the corresponding side plate 22 of the support member 17 and the lower jacket 8. By sandwiching each sandwiched portion 53 between the corresponding side plate 22 and the lower jacket 8, the transmitting portion 54 can easily be brought into contact with the corresponding side plate 22 and the lower jacket at a position closer to the fixed portion 24 than the sandwiched portion 53. Thus, the vibration rigidity can be improved with a simple structure.

According to the first embodiment, the transmitting portion 54 is brought into contact with both of the support member 17 and the lower jacket 8 at a position closer to the fixed portion 24 than the central axis C2 of the upper jacket 7. Therefore, vibration is transmitted between the lower jacket 8 and the support member 17 securely via a part of the support member 17 that is even higher in rigidity (high-rigidity portion 22A of the side plate 22). Thus, the vibration rigidity can further be improved.

According to the first embodiment, irrespective of the position of the upper jacket 7 within the telescopic adjustment range, the transmitting portion 54 of each second slide member 50 is brought into contact with both of the lower jacket 8 and the corresponding side plate 22 of the support member 17. Therefore, irrespective of the position to which the upper jacket 7 is moved relative to the lower jacket by the telescopic adjustment, vibration is transmitted between the lower jacket 8 and the support member 17 via a part of the support member 17 that is relatively high in rigidity.

The coupling portion 55 is deflected so as to move its distal end in the tightening axis direction J in the tightened state achieved by the tightening mechanism 18. According to this embodiment, the slit 57 extending to intersect the column axis direction X is provided between the coupling portion 55 and the transmitting portion 54. Therefore, deflection of the transmitting portion 54 together with the coupling portion 55 is suppressed.

In order to appropriately protect a driver upon a secondary collision, it is necessary that the upper jacket 7 slide relative to the lower jacket 8 by a predetermined distance. In the structure in which the first slide member 40 is attached to the upper jacket 7, the movement distance of the upper jacket 7 upon the secondary collision is shorter than the predetermined distance by a distance corresponding to the width of the first slide member 40 in the column axis direction X. Therefore, it is necessary to maintain the slide distance by reducing the fitting length between the lower jacket 8 and the upper jacket 7 by the distance corresponding to the width of the first slide member 40 in the column axis direction X. When the fitting length between the lower jacket 8 and the upper jacket 7 is reduced, the vibration rigidity of the steering system 1 decreases. According to the first embodiment, however, each transmitting portion 54 is brought into contact with both of the corresponding side plate 22 of the support member 17 and the lower jacket 8 at a position closer to the fixed portion 24 than the sandwiched portion 53. Therefore, vibration is transmitted between the lower jacket 8 and the support member 17 via a part of the corresponding side plate 22 that is higher in rigidity (high-rigidity portion 22A) than a part where the sandwiched portion 53 is brought into contact (low-rigidity portion 22B). Thus, the vibration rigidity can sufficiently be secured even when the fitting length between the lower jacket 8 and the upper jacket 7 is reduced.

Figure 7:
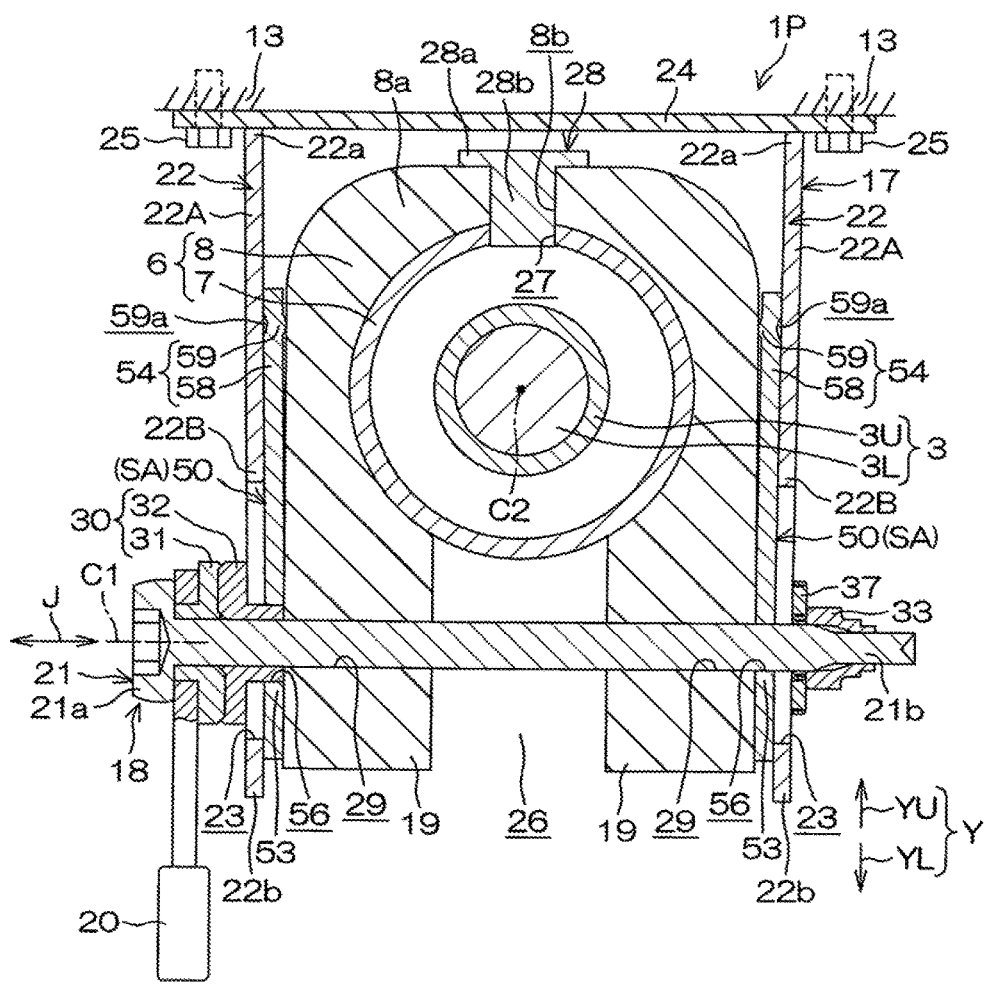
FIG. 7 is a schematic sectional view of a steering system according to a second embodiment of the present invention.

FIG. 7 is a schematic sectional view of a steering system 1P according to a second embodiment of the present invention. In FIG. 7, the same members as the members described above are represented by the same reference symbols to omit their description (the same applies to FIG. 8 and FIG. 9 described later). Referring to FIG. 7, the steering system 1P according to the second embodiment is different from the steering system 1 according to the first embodiment (see FIG. 2) as follows. The transmitting portion 54 of each extending portion 52 includes a flat plate portion 58 and a protruding portion 59. The flat plate portion 58 is interposed between the lower jacket 8 and the corresponding side plate 22 of the support member 17. The protruding portion 59 protrudes from the flat plate portion 58 toward the lower jacket 8 (in the tightening axis direction J). The protruding portion 59 is formed into a shape of a thread extending in the column axis direction X. The protruding portion 59 has a substantially trapezoidal shape when viewed in the column axis direction X. In this embodiment, the distal end of the protruding portion 59 is flat, but may be formed into an arc shape when viewed in the column axis direction X.

The protruding portion 59 is formed by deforming the flat plate portion 58 by press working or the like. Therefore, a recessed portion 59a is formed at a position corresponding to the protruding portion 59 on a surface of the flat plate portion 58 on a side (surface on the corresponding side plate 22 side) opposite to a surface on the side where the protruding portion 59 is provided (surface on the lower jacket 8 side). In the second embodiment, the protruding portion 59 is brought into contact with the lower jacket 8 at a position closer to the fixed portion 24 (position on the tilt direction upper side YU) than the central axis C2 of the upper jacket 7, and the flat plate portion 58 is brought into contact with the corresponding side plate 22. Thus, vibration is transmitted between the lower jacket 8 and the corresponding side plate 22 of the support member 17 via the flat plate portion 58 and the protruding portion 59.

According to the second embodiment, effects similar to those of the first embodiment are attained. According to the second embodiment, the protruding portion 59 protrudes from the flat plate portion 58 toward the lower jacket 8. Therefore, the lower jacket 8 is brought into contact with the protruding portion 59 in the tightened state of the tightening mechanism 18. Thus, the area of a part of the transmitting portion 54 that is brought into contact with the support member 17 and the lower jacket 8 can be reduced as compared to a case where the flat plate portion 58 is brought into contact with both of the support member 17 and the lower jacket 8. This makes it possible to reduce the resistance force generated by the frictional slide between the support member 17 and the transmitting portion 54 and between the lower jacket 8 and the transmitting portion 54 upon a secondary collision. As a result, it is possible to suppress an excessive increase in the second resistance force G2 generated by the second relative slide between the support member 17 and the second slide member 50 and between the lower jacket 8 and the second slide member 50 upon a secondary collision. That is, the vibration rigidity can be improved without hindering the second relative slide.

Figure 8:
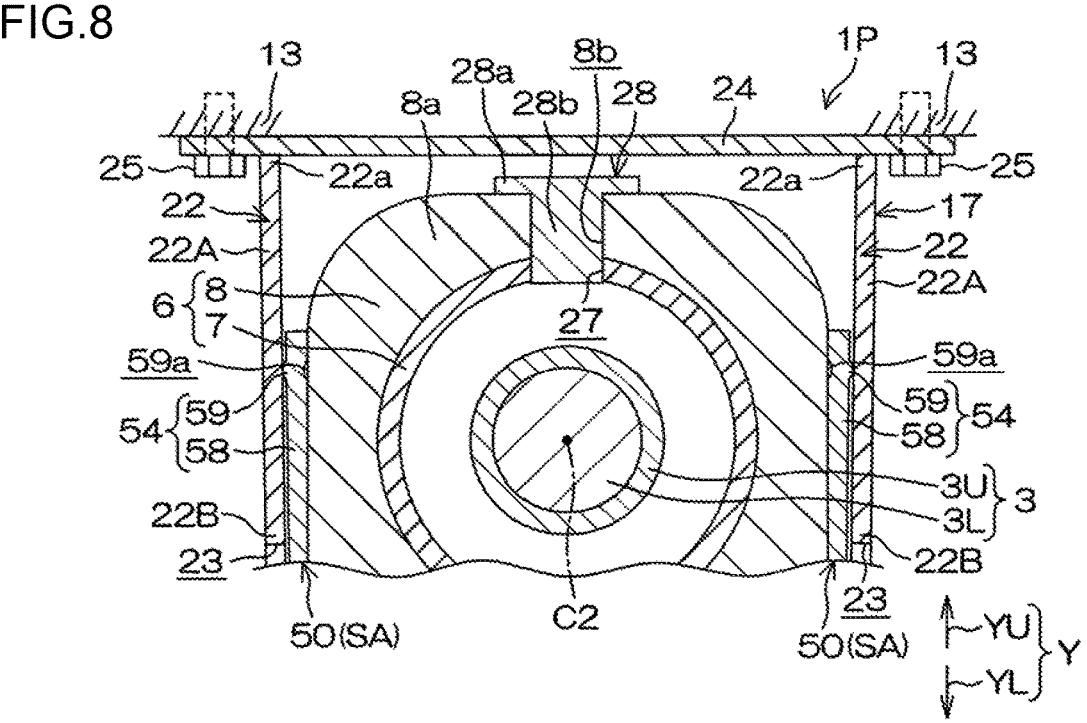
FIG. 8 is a schematic sectional view of a steering system according to a first modified example of the second embodiment.
Figure 9:
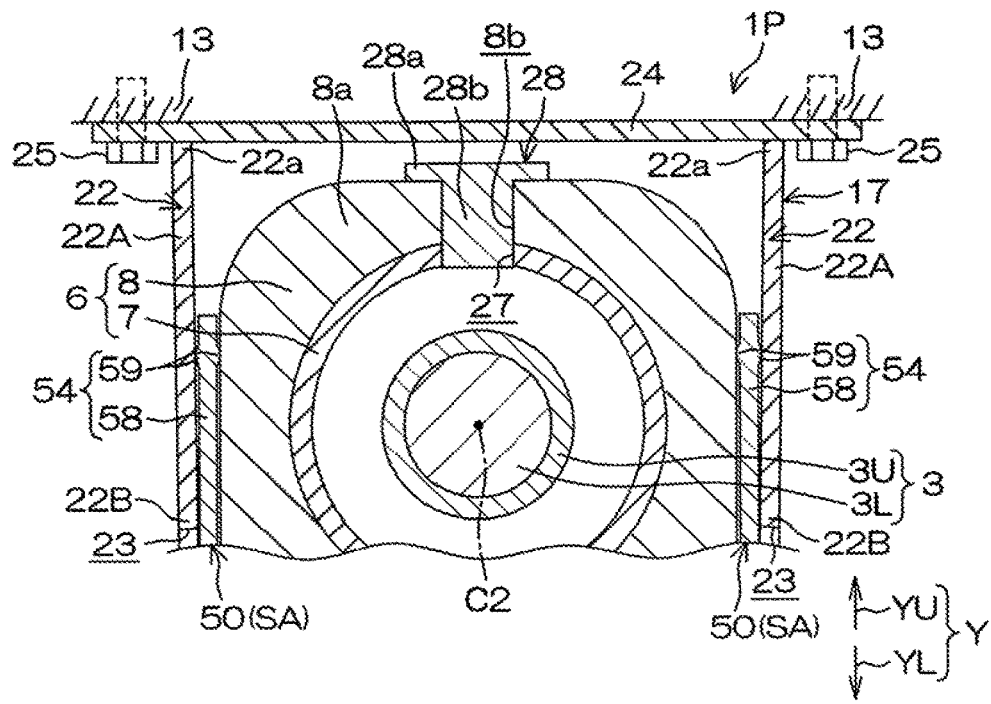
FIG. 9 is a schematic sectional view of a steering system according to a second modified example of the second embodiment.

As illustrated in FIG. 8, the protruding portion 59 may protrude toward the corresponding side plate 22 of the support member 17 unlike the second embodiment. In this case, the protruding portion 59 is brought into contact with the corresponding side plate 22 at a position closer to the fixed portion 24 (position on the tilt direction upper side YU) with respect to the central axis C2 of the upper jacket 7, and the flat plate portion 58 is brought into contact with the lower jacket 8. As illustrated in FIG. 9, the protruding portion 59 may protrude toward both of the corresponding side plate 22 of the support member 17 and the lower jacket 8 unlike the second embodiment. In this case, the protruding portion 59 is brought into contact with the corresponding side plate 22 and the lower jacket 8 at positions closer to the fixed portion 24 (positions on the tilt direction upper side YU) than the central axis C2 of the upper jacket 7. Thus, when the protruding portion 59 protrudes toward both of the corresponding side plate 22 of the support member 17 and the lower jacket 8, the area of the part of the transmitting portion 54 that is brought into contact with the support member 17 and the lower jacket 8 can further be reduced.

The present invention is not limited to the embodiments described above, and various modifications may be made as follows. For example, the steering system 1 need not essentially include the pair of second slide members 50. That is, one of the second slide members 50 may be provided alone.

In the embodiments described above, the first slide member 40 and the second slide members 50 are formed integrally by press working, forging, or the like. Alternatively, the first slide member 40 and the second slide members 50 that are formed separately may be fixed (coupled) to each other by welding or the like unlike the embodiments described above. In the embodiments described above, the first slide member 40 and the second slide members 50 are formed of a metal, but may be formed of a resin or the like unlike the embodiments described above. In the embodiments described above, the first slide member 40 and the second slide members 50 are fixed to each other, but need not essentially be fixed to each other. For example, the first slide member 40 and the second slide members 50 may be engaged with each other by protrusions and recesses so as to be movable together.

Unlike the embodiments described above, the first slide member 40 may be fixed to the upper jacket 7 by welding or the like. In this case, the second relative slide always occurs immediately after a secondary collision occurs. Unlike the embodiments described above, the second slide members 50 may be fixed directly to the upper jacket 7 without providing the first slide member 40 in the shock absorbing mechanism SA. Also in this case, the second relative slide always occurs immediately after a secondary collision occurs.

What is claimed is:

1. A steering system, comprising:
   an upper jacket to which a steering member is connected at one end in a column axis direction;
   a lower jacket externally fitted to the other end of the upper jacket in the column axis direction in a slidable manner;
   a support member including a fixed portion that is fixed to a vehicle body, and configured to support the lower jacket; and a shock absorbing mechanism configured to absorb a shock of a secondary collision, the shock absorbing mechanism including a slide member configured to move together with the upper jacket, and to frictionally slide relative to the support member upon the secondary collision, wherein the slide member includes:

a sandwiched portion that is sandwiched between the support member and the lower jacket; and a transmitting portion that is formed integrally with the sandwiched portion, and is brought into contact with both of the lower jacket and the support member at a position closer to the fixed portion than the sandwiched portion.

2. The steering system according to claim 1, wherein the transmitting portion extends from the sandwiched portion toward the fixed portion between the support member and the lower jacket.

3. The steering system according to claim 1, wherein the transmitting portion is brought into contact with both of the support member and the lower jacket at a position closer to the fixed portion than a central axis of the upper jacket.

4. The steering system according to claim 1, wherein the transmitting portion is brought into contact with both of the support member and the lower jacket irrespective of a position of the upper jacket within a telescopic adjustment range.

5. The steering system according to claim 1, wherein the transmitting portion includes:

a flat plate portion that is interposed between the support member and the lower jacket; and a protruding portion that protrudes from the flat plate portion toward at least one of the support member and the lower jacket.

6. The steering system according to claim 1, wherein the shock absorbing mechanism further includes another slide member attached to the upper jacket, and configured to frictionally slide relative to the upper jacket upon the secondary collision.

* * * * *